N. P. MIX & W. E. JACOBS.
Wind-Wheels.
No. 160,219. Patented Feb. 23, 1875.
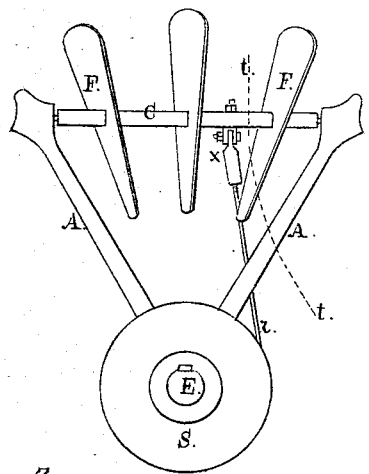
Fig. 1.
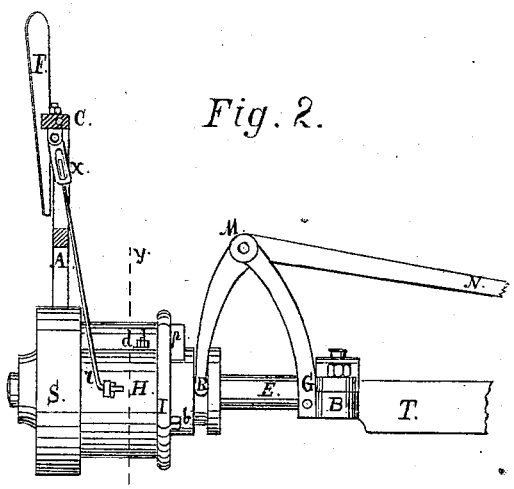
Fig. 2.
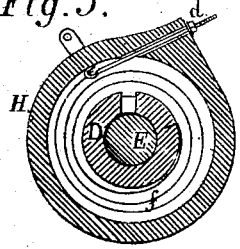
Fig. 3.
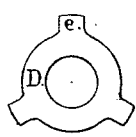
Fig. 4.
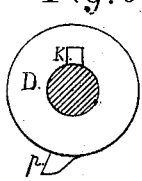
Fig. 5.
Fig. 6.
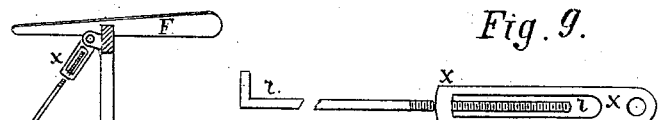
Fig. 9.
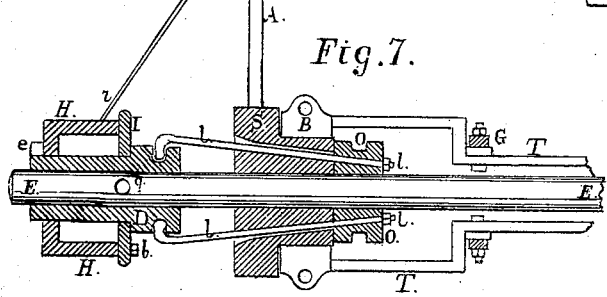
Fig. 7.
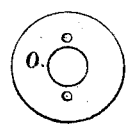
Fig. 8.
Witnesses:
J. Moser
P. Schall
Inventors:
N. P. Mix
W. E. Jacobs

UNITED STATES PATENT OFFICE.

NEWELL P. MIX, OF AVENUE, AND WILLIAM E. JACOBS, OF COLUMBUS, OHIO; SAID JACOBS ASSIGNOR TO SAID MIX.

IMPROVEMENT IN WIND-WHEELS.

Specification forming part of Letters Patent No. 160,219, dated February 23, 1875; application filed November 9, 1874.

*To all whom it may concern:*

Be it known that we, NEWELL P. MIX, of Avenue, in Franklin county, State of Ohio, and WILLIAM E. JACOBS, of Columbus, of same county and same State, have invented a new and important Improvement in Wind-Wheels, of which the following is a specification:

The object of our invention is improvements in the construction of those parts in a wind-wheel which serve to turn the sails or fans in and out of the wind, in order to afford a better command of the wheel, as hereinafter more fully described.

Figure 1 of the accompanying drawing is a front view of a segment of the wheel; Fig. 2, a side view of the same, partly in section, through the line $t\ t$ in Fig. 1, showing the sails F when turned to the wind. Fig. 3 is a cross-section of the oscillating hub H, taken through the line $y\ y$ of Fig. 2, showing hooked bolt $d$, spring $f$, and core or sleeve D. Fig. 5 is a side view, and Figs. 4 and 6 end views, of said core. Fig. 7 represents a horizontal section of the wheel, with oscillating hub H placed in front of it, and the sails in the position they have when turned out of the wind. Fig. 8 shows the end view of the sliding head O, and Fig. 9 the construction of the extension-rod $r\ x$.

Similar letters indicate corresponding parts.

The turn-table T, partly shown in Figs. 2 and 7, is of ordinary construction. B is one of the bearings secured to the turn-table, in which revolves the shaft E, in Fig. 2, and the boss of the spider S, in Fig. 7. To the spider S of the wheel are securely attached the arms A, six (more or less) in number, to the ends of which are pivoted the bars C, in which the fans F are inserted. The bars C have a short arm, to which the extension-rods $r\ x$ are attached at $x$, the other ends $r$ of said rods being secured to the hub H. This hub, as shown in Fig. 7, has a bearing on a sleeve, D, at both ends, and oscillates on the same. A spring, $f$, (see Fig. 3,) is secured to the sleeve D, and the other end is attached to the hub H by means of a hooked bolt, $d$, with a long screw-thread and a nut outside of the hub. The sleeve D has lugs or ears $e$, Figs. 4 and 5, to fit into corresponding recesses in the end of the hub, so as to allow the hub H to pass over the sleeve D, and prevent it from slipping off. $a\ k$ is a spiral groove in the sleeve, Fig. 5, straight at both ends, into which fits a friction-roller, 9, secured to a pin of the shaft E, so as to slide easily in the groove, and to give the sleeve a rotary motion when the latter is moving in and out on the shaft, but only when it is in the spiral part of the groove. A projection, $p$, on the sleeve, Figs. 2 and 6, strikes against the bolts $b$, by which the head I is secured to the main part of the oscillating hub, and allows the hub to oscillate on the sleeve D, in a direction opposite to the tension of the spring $f$. At the same time it is used to give the spring an approximate degree of tension, while the nut of the bolt-screw $d$ serves to bring the tension of the spring to the accurate point required. The screws $b$, by which the head I is secured to the main part of the hub, are so placed, in reference to the ears $e$, that the sleeve D cannot be withdrawn from the hub H. The spring $f$ is coiled round the sleeve in such a direction that its tension tends to hold the fans to the wind. The extension-rod $r\ x$, Fig. 9, consists of two pieces, of which one, $r\ r$, has a screw-thread at one end to fit into the piece $x\ x$, for the purpose of adjusting the rod to bring the fans to a true face.

The turning in and out of the wind of the fans is effected by the lever R M N, Fig. 2, which turns in M. The arms M $g$ being secured to the turn-table, the ends R of the lever-arms M R play in the circular slot of the sleeve D. By raising the end N of the other lever-arm, the hub H will be withdrawn from the spider, and make a rotary motion while sliding away, in consequence of which the rod $r\ x$ will turn the fans F to the position indicated in Fig. 7. When the oscillating hub H is placed in front of the wheel, the sleeve D is moved to and from the spider by means of the rods $l\ l$, two or more in number, which extend through the boss of the spider S, and the sliding piece O, to which they are secured by nuts, and which is moved by a lever (not shown here) in the same way as the lever N M R, moves the sleeve D, in Fig. 2.

The advantage of this arrangement consists in having the bearing B close by the wheel.

Having thus described our invention, we claim as new, and wish to secure by Letters Patent—

1. The grooved sleeve D with pin and friction-roller 9, projection $p$, and lugs $e$, substantially as herein shown and described.

2. The combination of the oscillating hub H with the head I, the spring $f$, the bolts $b$, and the sleeve D, substantially as described and for the purpose set forth.

3. The bolt $d$, the bolts $b$, and projections $p$, for giving tension to the spring $f$, substantially as herein specified, and for the purpose set forth.

4. The sliding head O, in Fig. 7, with the rods $l\ l$, substantially as described.

N. P. MIX.
      W. E. JACOBS.

Witnesses:
 J. MOSER,
 P. SCHALL.